United States Patent Office 2,947,196
Patented Aug. 2, 1960

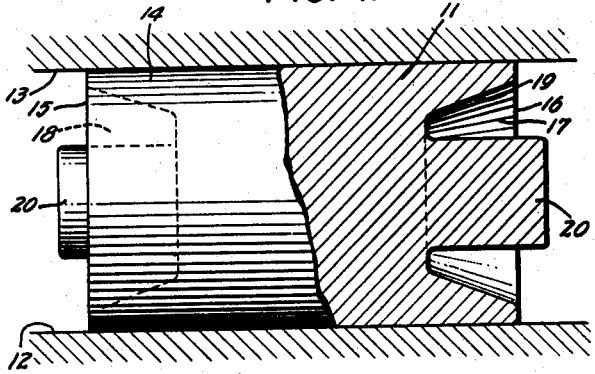
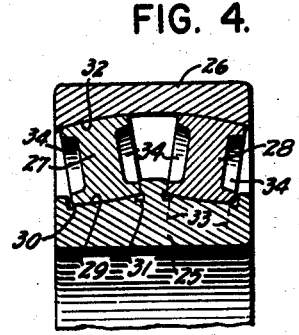
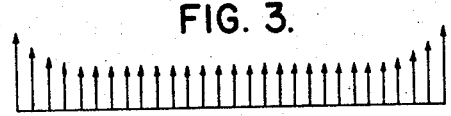
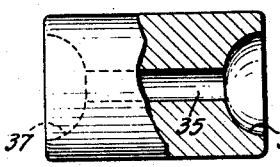
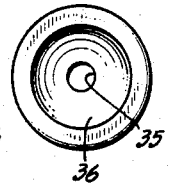
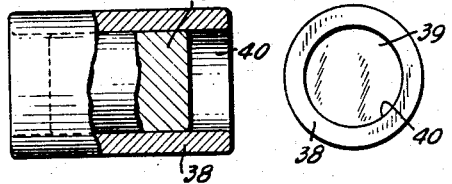
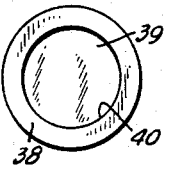
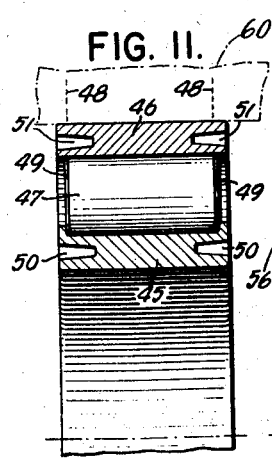
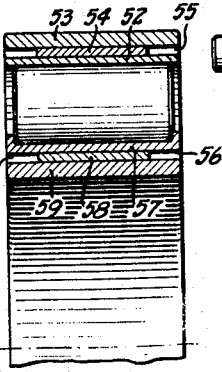
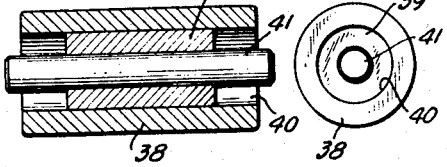
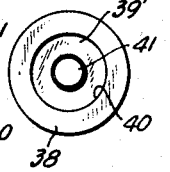
INVENTORS
HORACE B. VAN DORN
RONALD W. MORAN
BY
ATTORNEYS

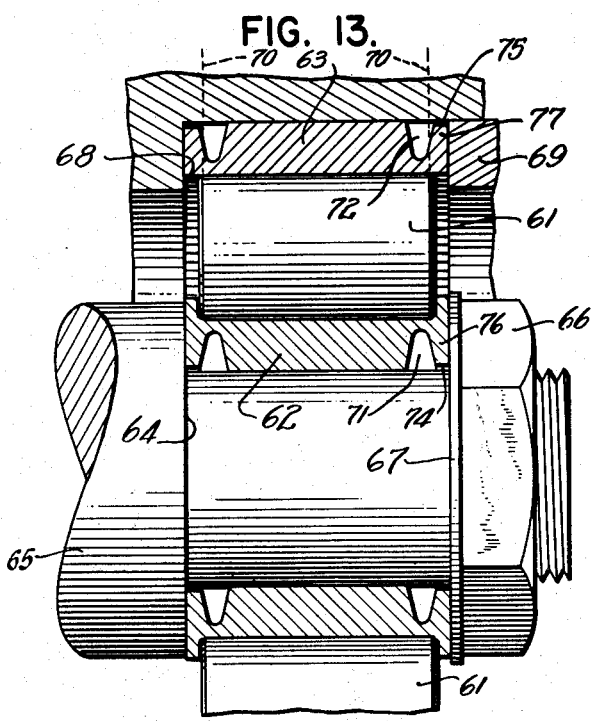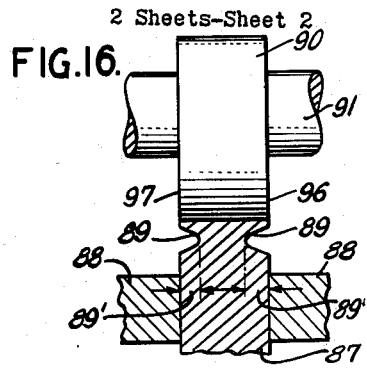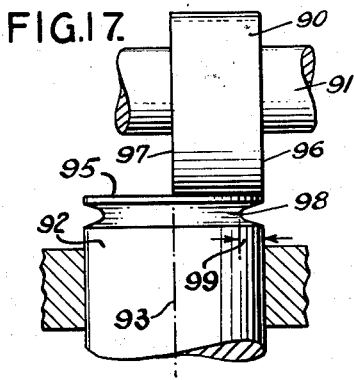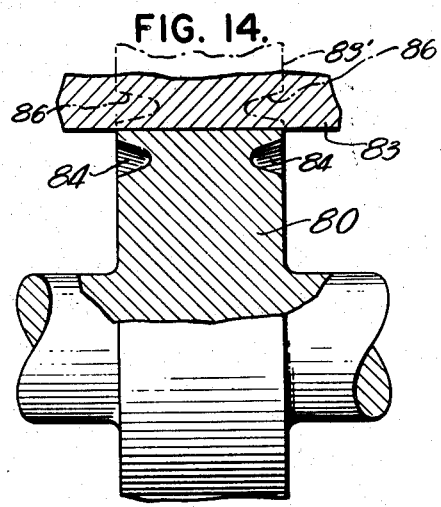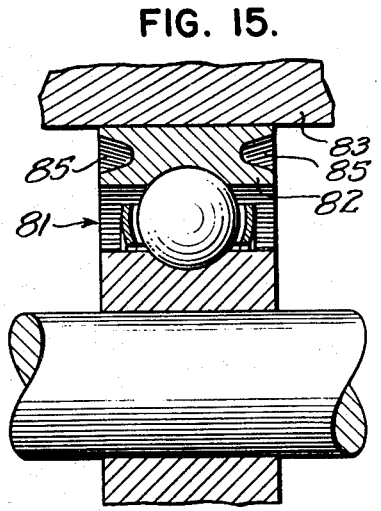

2,947,196

CAM-FOLLOWER CONSTRUCTION

Horace Bishop Van Dorn and Ronald Wesson Moran, New Britain, Conn., assignors to The Fafnir Bearing Company, New Britain, Conn., a corporation of Connecticut Filed Nov. 17, 1955, Ser. No. 547,408

5 Claims. (Cl. 74—569)

Our invention relates to an improved construction for relatively rolling elements, such as bearing rollers and raceways therefor, as well as cams or cam-followers, and the like. This application is a continuation-in-part of our application Serial No. 262,989, filed December 22, 1951, and now abandoned.

In bearing rollers of conventional construction, the roller is generally cylindrical or frusto-conical but at least makes essentially a line-contact with the raceway in which it is supported. Under load conditions, mechanical wear is found to occur at the finite ends of the roll, i.e. at the finite ends of the line of contact. This effect, known as "end effect," may be attributed to metal at the center of the contact area being supported by adjacent metal which is also in compression, while metal at the ends, or axially beyond what may be termed the "terminal planes" of the rolling member, does not have the advantage of balanced hydrostatic support from adjacent metal. This unbalance causes elevated stress concentrations at the extremities of the rollers and in the corresponding race areas; this elevated end stress becomes the design working maximum, a factor limiting the potential capacity of the relatively rolling elements. The material in these end zones exhibits early fatigue, and either the end of the roller surface, or the part of the raceway traversed by the end of the roller surface, flakes and erodes prematurely. These normal tendencies toward early breakdown of the materials of the roller or of the raceway may be accelerated by inadvertent initial misalignment of the roller in the raceway or from such angular misalignment or displacements as may result from heavily loaded axle deflections. Since the fatigue life of a bearing is approximately inversely proportional to the cube of the load, or inversely proportional to the ninth power of the stress, it is clearly seen how sensitive the fatigue life is to end-stress conditions. In roller-bearing assemblies, high end-stress concentrations are accompanied by skewing forces which are the cause of unnecessary retainer wear.

It will be appreciated, for purposes of the present discussion, that the end of a roller is essentially that part of the roller at which it may be said to provide, or to be provided with, radial supporting material. Some rollers are constructed with rounded or heavily chamfered ends, so that the ends of these rollers may be the axially inner edge of the chamfer; thus, it will be understood throughout the present discussion that the term "roller end" applies to material axially outwardly of the so-called "terminal plane," the "terminal plane" being that extreme radial plane in which the roller may be said to provide or to be provided with direct radial support.

It is, accordingly, an object of the invention to provide an improved construction of the character indicated.

It is another object to provide an improved cam or bearing roller construction which may substantially prolong the life of the roller and of the cams or races over which it runs, as well as of retainers for bearing rollers so constructed.

Another object is to provide an improved race-construction permitting prolonged life of a conventional roller employed with such race, while, at the same time, permitting prolonged life of the race itself.

It is a specific object to provide an antifriction-bearing construction in which the axial distribution of stress may be substantially uniform, even at the terminal planes of the roller.

A further object is to provide a roller construction in which end stress is not a substantial factor limiting the capacity; stated in other words, it is an object to gain added effective roller length (and its resultant increase in load capacity) for any given set of space limitations.

Also, it is an object to provide a roll construction which may carry a given load for a substantially longer period of time, or which may carry a substantially greater load for a given period of time.

Another specific object is to provide an anti-friction-bearing construction in which sharp transitions in the axial distribution of stress may be substantially reduced.

A further specific object is to provide an improved cam and cam-follower construction.

It is also a specific object to provide an improved roller construction meeting the above objects without requiring great changes in conventional roll-finishing processes, and without requiring special additional processes of high accuracy.

Other objects and various further features of the invention will be pointed out, or will occur to those skilled in the art from a reading of the following specification, in conjunction with the accompanying drawings. In said drawings, which show, for illustrative purposes only, preferred forms of the invention:

Fig. 1 is an enlarged elevation in partial section illustrating a bearing roll of the invention, seated on spaced raceways;

Figs. 2 and 3 are load diagrams, respectively illustrating radial-stress distribution for the roll of Fig. 1 and for a roll of conventional configuration;

Fig. 4 is a fragmentary sectional view of a double-row "spherical"-roller bearing incorporating features of the invention;

Fig. 4A is a similar fragmentary sectional view of a tapered-roller construction;

Figs. 5, 7 and 9 are elevations in partial section of modified roll constructions of the invention;

Figs. 6, 8 and 10 are end views of the constructions of Figs. 5, 7 and 9, respectively;

Fig. 11 is a fragmentary sectional view of a bearing including raceways incorporating features of the invention;

Fig. 12 is another fragmentary sectional view of a bearing, illustrating a modified race construction;

Fig. 13 is an enlarged fragmentary sectional view of another race-ring construction;

Figs. 14 and 15 are fragmentary sectional views of alternative cam-follower-roll constructions; and Figs. 16 and 17 are fragmentary views in longitudinal elevation, showing cam and follower-rod organizations utilizing our invention.

Briefly stated, our invention contemplates principal application to antifriction-bearing rolls or to the raceways for such bearings, and to cam and follower constructions. In such cases, contact of the roll with the race or cam is esesntially a line-contact, and this contact may be said to exist between terminal planes. The axial distance between these terminal planes may be determined by the axial length of the raceway or of the cam, or by the effective length of the roll.

Our invention consists of so excavating either the ends of the roll or the ends of the race-ring or cam that a certain substantial end part of either the roll or the race (or cam) is rendered variably flexible, within the elastic limit of the material, so that severe stress concentrations and extreme stress levels cannot exist at the terminal planes; in the case of rollers, we find it preferable that the relief at the terminal plane shall involve a circular intercept, with a minimum diameter that is substantially sixty percent of the roll diameter at the terminal plane. A number of applications of this principle will be shown and described.

In Fig. 1, we show a cylindrical roll 11, rolling on cylindrical raceways 12—13. The outer surface 14 of the roll 11 may be formed structurally in a conventional manner, as in a centerless-grinding operation. As explained above, our invention consists in so excavating the race or the roll that end sections are rendered variably flexible; in the simplified case of Fig. 1, the ends of the roll are excavated.

In Fig. 1, the outer surface 14 of the roll 11 mates with the raceway 13 for the full axial extent of the roll, so that terminal planes may be said to exist at the roll-end faces 15—16. It will be understood that if the outer surface 14 were chamfered or rounded at its ends, then the terminal planes would exist at the sections where roll and raceway cease to contact. As indicated, the roll 11 is rendered variably flexible at both ends by substantial excavations 17—18, and we prefer that the outer surfaces 19 of such recesses be tapered or flared towards the terminal plane, so as to provide cantilevered, variably flexible support for the roll surface 14, reducing as the end section is approached. For stress relief, it matters not whether the recesses 17—18 extend to the center of the roll or whether central projections, as shown at 20, are formed in the bottom of the recesses and are projected axially outwardly of the terminal planes for locating purposes; however, as shown in the drawing, the relief at the terminal plane (represented by the circular intersection of taper 19 with the terminal plane) occurs at a diameter exceeding the above-stated minimum of sixty percent of the roll diameter.

The axial depth of recess 17 (or 18) is, as indicated, preferably sufficient, in relation to the average thickness of the annular roll end, to permit radially inward resilient yielding for stress relief. This desirable feature may be stated in structural terms as requiring that the average thickness of the annular roll-end portion shall be less than the recess depth at the location for which the annular thickness equals such average thickness; alternatively, the axial depth of an end recess 17 (or 18) is preferably at least as great as the average annular roll thickness at the recessed ends.

The stress relief achieved when using the roll of Fig. 1, under a normal rolling load, is demonstrated by a comparison of the stress diagrams of Figs. 2 and 3. Both diagrams depict load distribution for rolls of the same outer dimensions and subjected to the same load. Fig. 3 repersents the case of a conventional roll in which no provision is made for stress relief at the ends, that is, in which the roll surface is contoured to mate with the race for the full axial extent of the span between terminal planes, and in which the roll ends are solid and are not excavated. It will be seen that, due to the lack of radial flexibility at the ends, extreme stress concentrations occur at the ends, that is, at the terminal planes. These stress concentrations either limit the capacity or become the source of early fatigue and failure of conventional rolls and raceways. On the other hand, a roll excavated as described in Fig. 1 may, while sustaining the same load as that depicted in Fig. 3, exhibit substantially uniform stress distribution along the line of contact between the roll and the race, as shown in Fig. 2. Of course, if the load is to be uniformly sustained for the full span between terminal planes, in the manner shown in Fig. 2, then the extent of the excavations 17—18, that is, the manner in which the race-supporting section is reduced upon approach to the terminal planes, will vary, depending upon the size of the roll, the size of the race, and the load. Generally speaking, however, the excavtion will be substantial, and axially inwardly of the terminal planes.

In Fig. 4, we show an application of principles of the invention to a twin-row spherical-roller bearing, comprising inner ring 25, an outer ring 26, and rollers 27—28, in each of two separate sets of raceways. The inner raceways, as at 29, are generally concave to mate with the convex rolling surface of roll 28, but end recesses 30—31 terminate the raceways short of the full axial extent of the roll 27; the relief at the terminal planes is again observed to involve a circular intercept of diameter exceeding the preferred minimum of sixty percent of the roll diameter at the terminal plane. The outer race 32 is spherical and common to rolls 27—28 of both rows. Under these circumstances, it will be seen that terminal planes for the rollers, such as the roller 27, may be axially inwardly of the ends of the rollers, as indicated by the phantom lines 33 of Fig. 4. Under the circumstances, we prefer and have shown end excavations 34, at the ends of the rollers axially inwardly of these planes 33, in order that there may be the reduction in stress concentrations discussed above in connection with Figs. 1 to 3.

Fig. 4A illustrates application of the invention to a tapered roller 27' between race rings 25'—26'. It will be noted that end excavations at 34' extend substantially inwardly of the terminal planes 33' and that the relief intercept meets the preferred limitation discussed above for other forms.

In Figs. 5 and 6, we have shown another roll construction exhibiting the desired characteristics and inherently simple to construct. The roll in Fig. 5 has a central continuous bore 35 between the tapering end recesses 36—37. The ends of the roll at the outer corners are chamfered, and the recesses 36—37 extend inwardly of the inner limits of the chamfers, and therefore axially inwardly of the terminal planes of the roll.

In Figs. 7 and 8, a flexible roll is built in two pieces from a relatively thin sleeve 38, of section thin enough to flex under a normal rolling load, and a tight-fitting plug 39 is positioned in the bore of the sleeve 38 axially centrally of the sleeves 38. Since the plug 39 is of lesser axial extent than the sleeve 38, the desired end recesses are defined, as at 40, between the end of the plug 39 and the end of the sleeve 38.

Figs. 9 and 10 illustrate a construction generally similar to that of Figs. 7 and 8, except that the plug 39' has a central bore in which a pin 41 is force-fitted. The pin 41 may be of greater axial extent than the sleeve 38, so that when centrally held by the plug 39' the pin 41 may project out both ends of the sleeves 38, thereby providing a means for locating the roll without damaging contact to the ends of the sleeve 38. It will be noted that the stress relief accompanying a construction along the lines of Figs. 9 and 10 may be just as effective as in the construction in Figs. 7 and 8.

In Fig. 11, we illustrate a roller bearing in which stress relief is achieved through excavation at the ends of race-rings, rather than through excavation at the ends of the roll. The bearing in Fig. 11 may comprise an inner ring 45 and an outer ring 46, spaced by cylindrical rolls 47. Terminal planes 48 may be defined by the inner limits of roll chamfers 49, and excavations 50 in the inner ring 45, inwardly of the terminal planes 48 may, in certain circumstances, provide all the necessary stress relief. Alternatively, the outer race-ring alone may be similarly excavated as at 51 and, at the same time, provide all the necessary stress relief. However, for extreme flexibility, both rings 45—46 may be excavated, as shown. It will be appreciated that with stress relief in the raceway and with standard (unexcavated) rolls 47, as shown in Fig. 11, stress concentrations may not occur along the lines of contact, and there may be the uniform distribution of stress depicted in Fig. 2.

In Fig. 12, we show a modified construction in which the inner ring and the outer ring are each built up of sleeve layers. The outer ring is formed with an inner race-sleeve 52, an outer sleeve 53, and an intermediate sleeve 54; and the intermediate sleeve 54 is of lesser axial extent than the sleeve 52 in order to define the desired stress-relieving recess 55 at both ends. In a similar manner, stress-relieving recesses 56 may be formed at the ends of the inner ring, which is made up of a construction of three sleeves 57—58—59. The stress-relief functions of the construction of Fig. 12 may be analogous to those of the construction of Fig. 11.

It will be noted that the bearings of Figs. 11 and 12 may be cam-follower rolls. In such cases, the bore of the inner-ring member (45 or 59) may accommodate a supporting pin, and the outer-ring member (46—53) may ride the surface of a cam, as schematically indicated by phantom outline 60 in Fig. 11. In these applications, our construction will be seen to prolong the life and to extend the capacity of the cam 60 as well as that of the follower roll.

In Fig. 13, we illustrate a modified race-ring construction, incorporating features of the invention in a manner which may be more simple to achieve under certain manufacturing circumstances. The bearing shown comprises cylindrical rolls 61 between spaced race-ring 62—63. The inner ring 62 is held at one end against a shoulder 64 or shaft 65 and is clamped in position by a nut 66 and washer 67 at the other end. The outer ring 63 is held between a shoulder 68 and spacer 69. As in the case of the other forms discussed above, we provide means rendering the race-rings variably flexible at locations inside the terminal planes 70. This is achieved by recesses 71—72 open at the ends of the inner and outer rings 62—63, respectively. The recesses 71—72 happen to be of a contour that can be simply produced by a cross-slide or forming operation, but the clearances at 74—75 provide the recesses 71—72 with openings to the ends of the rings. It will be noted that, in the construction of Fig. 13, the recesses 71—72 may provide sufficient variable flexibility to avoid substantial end-stress conditions and that at the same time the flanges 76—77 defining the outer sides of recesses 71—72 provide very substantial radial shoulders for end abutment of the bearing at 64—67 and 68—69.

In Figs. 14 and 15, we show alternative applications of the invention to cam-follower roll constructions, the roll 80 of Fig. 14 being solid, and the roll 81 being of the antifriction variety with an outer ring 82 to follow the cam 83. In both cases, end-stress concentrations are avoided along the line of contact with cam 83 by recessing the roller ends (at 84—85, respectively) axially inwardly of the terminal planes, thereby providing variable flexibility in the end sections of the follower rolls. Alternatively, variable flexibility may be achieved by recessing the ends of the cams, inwardly of the terminal planes, as suggested at 86 in the phantom outline 83' of Fig. 14, as will be understood.

In Figs. 16 and 17, we show application of our invention to two alternative organizations of a cam with a follower rod. In the arrangement of Fig. 16, a cam 90 is rotatably supported and driven by a camshaft 91, and a follower rod 87 is guided by means 88, to reciprocate on its guided axis, generally radially of the cam 90; means (not shown) urges rod 87 for continuous following contact with cam 90. Normally, the cam 90 or the follower face 95 of the rod 87 must be crowned in order to avoid the stress-reversal problem encountered at the limits of the line contact between cam 90 and follower rod 87. However, in accordance with the invention, either the end faces 96—97 of the cam may be recessed, as at 84 in Fig. 14, or recesses 89 may be provided near the follower surface 95 of rod 87. In either case, the follower surface 95 may be flat, and the cam surface 90 may be right-cylindrical, so that no crowning is necessary to achieve stress relief at the terminal planes (which in the described case are substantially at the cam end faces 96—97). We have indicated our preference that the axial extent 89' of recesses 89 shall be substantial, as by having each such depth 89' of the order of one-fourth the effective width of cam 90, and that the recesses 89 be provided sufficiently close to the follower surface 95 to achieve equalized stress loading along the contact line, even under dynamic load conditions.

In Fig. 17, we show a cam-and-follower arrangement of a variety found in internal-combustion engines as in the valve-lifter mechanism. Thus, in Fig. 17, the cam 90 may be one of a plurality of small cams on the valve-timing cam-shaft 91, and the valve lifter or rod 92 may be urged (by means not shown) continuously to follow the profile of cam 90. In the particular form shown, the axis 93 of the lifter 92 is offset to one side of the cam 90, and the lifter-rod diameter exceeds the overall width of the cam 90. The particular offset shown is such as to cause the periphery of the flat top 95 of the lifter 92 to ride substantially in the radial plane determining the right end face of the cam 90; in the case of Fig. 17, this can be viewed as the significant terminal plane. Because of the offset arrangement, the valve lifter 92 will tend to rotate about axis 93, with camshaft rotation.

As indicated, neither the top face 95' of the lifter 92, nor the peripheral surface of the cam 90, need be crowned, as has been customary either on cams as at 90 or on lifters as at 93, or on both. Cam surface 90 may thus be right-cylindrical and surface 95' flat, so that at any one instant full line contact between the cooperating parts 90—92 may be established, substantially on a radius of surface 95'. As in Fig. 16, extreme wear is effectively eliminated by recessing the valve lifter 92 inwardly of a terminal plane; since, in Fig. 17, the plane at face 96 is the terminal plane of primary significance, recessing is primarily needed and useful at that location; this may be identified as the terminal plane at that end of the line of cam-following contact which is more remote from the follower-rod axis 93. In the form shown, the recess takes the form of a single circumferentially extending groove 98, just underneath the top surface 95. Groove 98 may be of a radial depth 99 meeting the above-stated requirements for excavations inwardly of a terminal plane (96) and at the same time sufficiently deep so as to provide at least some relief beneath the other terminal plane 97; as in Fig. 16, the axial depth 99 (i.e. depth in terms of axial extent of cam 90) of groove 98 is shown to be substantially one-fourth the axial extent of cam 90.

It will be seen that we have disclosed improved antifriction-bearing and cam and follower constructions, permitting the more uniform axial distribution of load in a roller configuration. All forms of the invention avoid the extreme stress levels which under load can cause great damage in conventional constructions; in the case of excavated rollers, the end relief in all cases involves a circular intercept, with a diameter exceeding the above-stated minimum of sixty percent of the roll diameter at the terminal plane. By avoiding this principal source of wear, we have actually disclosed a means whereby bearing or cam life may be prolonged or whereby bearing-load or cam-load capacity may be increased in any given cam or bearing size or type. Of particular importance, our invention is adaptable to bearing or cam parts without requiring any change in the customary grinding and other finishing operations for like-size conventional components.

While we have described the invention in detail for the preferred forms shown, it will be understood that modifications may be made within the scope of the invention as defined in the following claims.

We claim:

1. In combination, a rotary cam means having a peripherally continuous cam surface, said rotary cam being adapted for rotation, and an antifriction roller means to follow the surface of said cam means as said cam means rotates, said roller means comprising a substantially cylindrical outer surface between opposite ends of the roller means so that contact between said cam surface and the outer surface of said roller means extends along a line between the opposite ends of the roller means, each of said opposite ends having face portions in a plane substantially perpendicular to said line of contact between the cam means and the roller means, each face portion of said roller means having an annular recess extending into said roller means a predetermined distance to provide a cantilevered, flexible support for the portion of said cylindrical outer surface adjacent the ends of said roller means.

2. The combination set forth in claim 1 wherein said predetermined distance which said annular recess extends into said roller means is at least equal to the average thickness of said roller means between said cylindrical surface and the closest wall of the recess.

3. In combination, a rotary cam means having a peripherally continuous cam surface, said rotary cam means being adapted for rotation, and an antifriction roller means to follow the surface of said cam means as said cam means rotates, said roller means comprising a substantially cylindrical outer surface between opposite ends of the roller means so that contact between said cam surface and the outer surface of said roller means extends along a line between the opposite ends of the roller means, each of said opposite ends having face portions in a plane substantially perpendicular to said line of contact between the cam means and the roller means, each face portion of said roller means having an annular recess extending into said roller means a predetermined distance, one wall of said recess being tapered relative to said line contact to provide a cantilevered, variable flexible support for the portion of said cylindrical outer surface adjacent the ends of said roller means.

4. In combination, a rotary cam means having a peripherally continuous cam surface, said rotary cam being adapted for rotation, and an antifriction roller means to follow the surface of said cam means as said cam means rotates, said roller means comprising a substantially cylindrical outer surface between opposite ends of the roller means so that contact between said cam surface and the outer surface of said roller means extends along a line between the opposite ends of the roller means, each of said opposite ends having face portions in a plane substantially perpendicular to said line of contact between the cam means and the roller means, each face portion of said roller means having an annular recess extending into said roller means a predetermined distance to provide a cantilevered, flexible support for the portion of said cylindrical outer surface adjacent the ends of said roller means, the diameter of the outermost wall of said annular recess at each of said end face portions being substantially sixty percent of the diameter of said roller means.

5. In combination, a rotary member having a peripherally continuous surface, a fixed member having a continuous surface substantially matching said peripherally continuing surface of said rotary member and spaced therefrom a substantially constant distance, a plurality of cylindrical roller elements positioned in the space between the surfaces of said rotary member and said fixed member to be in line contact with each of said surfaces between the opposite ends of each cylindrical roller element, each of said opposite ends of each cylindrical roller element having face portions in a plane substantially perpendicular to said line of contact, each face portion having an annular recess extending into each roller element a predetermined distance to provide a cantilevered, flexible support for the portion of the cylindrical surface adjacent the ends of each roller element.

References Cited in the file of this patent

UNITED STATES PATENTS

| | | |
|---|---|---|
| 1,152,161 | Foote | Aug. 31, 1915 |
| 1,199,105 | Nuttall | Sept. 26, 1916 |
| 1,449,193 | Rich | Mar. 20, 1923 |
| 1,544,362 | Wilcox | June 30, 1925 |
| 1,623,043 | Brown | Apr. 5, 1927 |
| 1,949,824 | Buckwalter | Mar. 6, 1934 |
| 2,031,818 | Buckwalter | Feb. 25, 1936 |
| 2,259,325 | Robinson | Oct. 14, 1941 |
| 2,311,423 | Wein | Feb. 16, 1943 |
| 2,426,083 | Corlett | Aug. 19, 1947 |
| 2,654,266 | Edelen | Oct. 6, 1953 |
| 2,735,313 | Dickson | Feb. 21, 1956 |